United States Patent [19]

Amemori

[11] Patent Number: 5,281,300

[45] Date of Patent: Jan. 25, 1994

[54] THIN FILM HEAD FOR A MAGNETIC STORAGE DEVICE

[75] Inventor: Kazuhiko Amemori, Kawasaki, Japan

[73] Assignee: Fujitsu Limited, Japan

[21] Appl. No.: 984,373

[22] Filed: Dec. 2, 1992

[30] Foreign Application Priority Data

Dec. 2, 1991 [JP] Japan .................. 3-317267

[51] Int. Cl.$^5$ .......................... B44C 1/22; C23F 1/00
[52] U.S. Cl. ........................... 156/626; 156/643;
156/656; 156/659.1
[58] Field of Search ............... 156/630, 626, 643, 646,
156/656, 657, 659.1, 664, 667; 29/603; 427/127,
128, 131; 360/123, 125

[56] References Cited

U.S. PATENT DOCUMENTS

| | | | |
|---|---|---|---|
| 4,632,724 | 12/1986 | Chesebro et al. | 156/626 |
| 5,059,278 | 10/1991 | Cohen et al. | 156/643 |
| 5,141,623 | 8/1992 | Cohen et al. | 156/656 X |

FOREIGN PATENT DOCUMENTS

1-251411  10/1989  Japan .
2-230505  9/1990  Japan .

*Primary Examiner*—William A. Powell
*Attorney, Agent, or Firm*—Welsh & Katz, Ltd.

[57] ABSTRACT

A method for fabricating a thin-film magnetic head comprises the steps of providing an alignment marker used for alignment in patterning processes on an insulating layer, depositing a conductor base layer on the insulating layer to bury the alignment marker underneath, growing a pattern on the conductor base layer by an electro-plating process while using said conductor base layer as an electrode, removing the conductor base layer except for a part thereof located under the pattern by a chemical etching process that acts selectively upon the conductor base layer while leaving the alignment marker and the insulating layer substantially unetched.

13 Claims, 10 Drawing Sheets

THIN FILM HEAD FOR A MAGNETIC STORAGE DEVICE

BACKGROUND OF THE INVENTION

The present invention generally relates to magnetic storage devices generally called "hard disk," and more particularly to a fabrication process of a thin film head used in such a magnetic storage device.

In computer systems, various magnetic storage devices are used. Among others, the device called "hard disk" is used extensively as a large capacity auxiliary storage device that cooperates with a high speed semiconductor memory device forming a main memory of a central processing unit.

In the hard disk devices, one or more rigid magnetic disks revolving about a common rotational axis at a high speed are provided, and a magnetic coating is provided on the upper and lower major surfaces of each magnetic disk. Typically, the magnetic disk is defined with a number of concentric tracks on the magnetic coating, and a magnetic head carried on a tip end of a swing arm scans the surface of the magnetic disk generally in the radial direction thereof as a result of the swinging motion of the arm.

Generally, the magnetic disk is revolved at a speed in the order of several thousand r.p.m. and the magnetic head that scans the surface of the magnetic disk establishes a magnetic engagement with the disk while being separated therefrom by a thin air foil.

Figure 1:
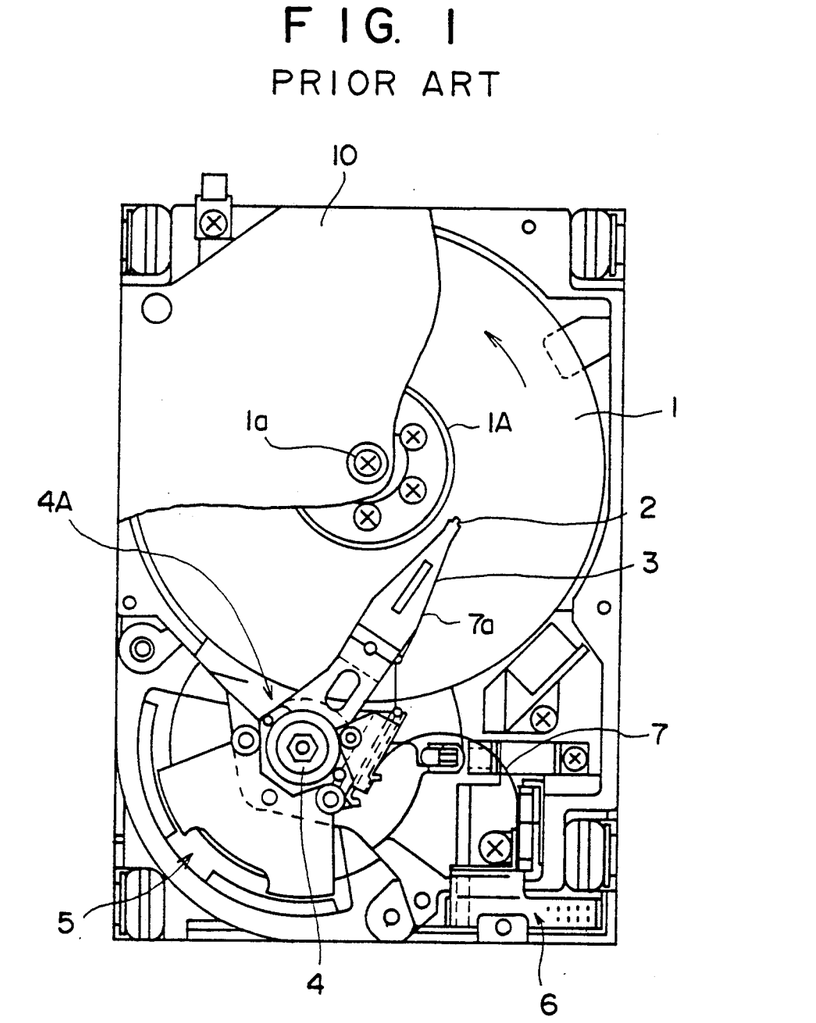
FIG. 1 is a diagram showing the structure of a conventional hard disk device in a plan view.

FIG. 1 shows a typical hard disk device in the plan view, wherein it will be noted that there is provided a magnetic disk 1 revolving about an axle 1a by a driving motor not illustrated in FIG. 1. At the outer periphery of the disk 1, there is provided a swing arm 3 such that the arm 3 is rotatable about an axle 4, and the arm 3 carries a magnetic head 2 on the free, tip end thereof. There, the arm 3 is driven by a voice coil motor 5 and swings about the axle 4, and the magnetic head 2 scans the surface of the disk 1 in the radial direction thereof with the swinging motion of the arm 3. Further, the magnetic head 2 is connected electrically to an electronic circuitry schematically illustrated by a numeral 6 by a flexible cord (FPC) 7. There, an interconnection wire 7a extending along the side wall of the arm 3 connects the magnetic head 2 and the flexible cord 7.

Figure 2:
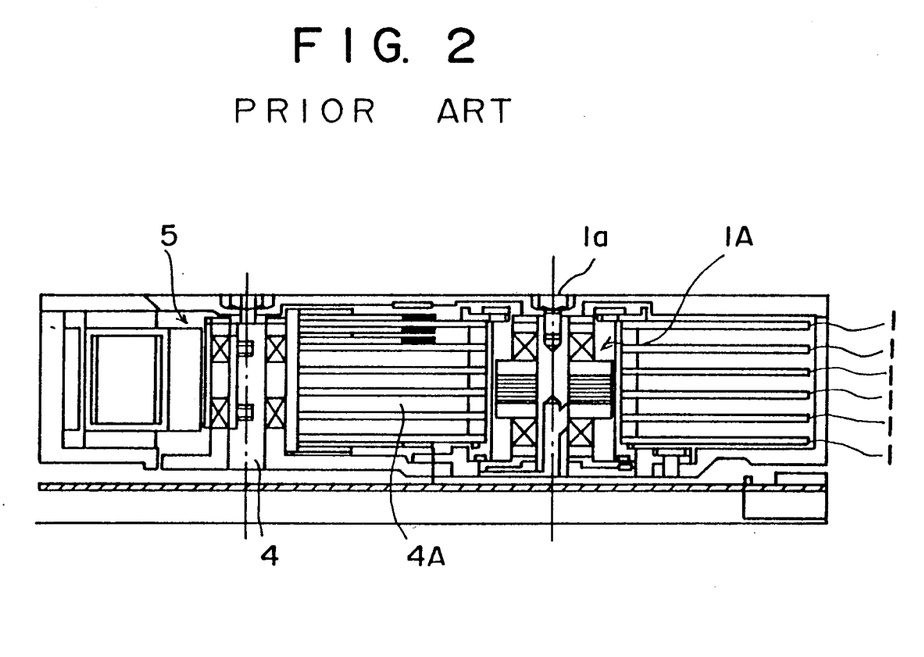
FIG. 2 is a diagram showing the hard disk device of FIG. 1 in a cross sectional view.

The structure shown in FIG. 1 is stacked by a number of layers as shown in FIG. 2, wherein it will be noted that there are a number of magnetic disks 1 stacked each other, and a number of swing arms 3 as well as a number of magnetic heads 2 are provided in correspondence to the plurality of magnetic disks 1. It should be noted that the swing arms 3 and the magnetic heads 2 are provided respectively in correspondence to the upper and lower major surfaces of each magnetic disk 1. Thereby, the swing arms 3 form an arm assembly 4A. Further, the entire structure of the hard disk device is accommodated in a hermetically sealed enclosure 10 (FIG. 1).

Figure 3:
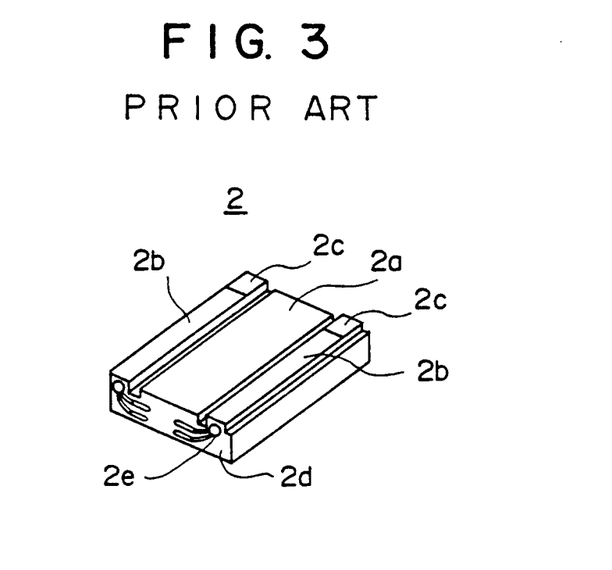
FIG. 3 is a diagram showing a magnetic head used in the hard disk device of FIG. 1.

FIG. 3 shows the magnetic head 2 in a perspective view.

Referring to FIG. 3, the magnetic head 2 includes a head body 2a that is formed with a pair of elongated air bearing surfaces 2b. The air bearing surfaces 2b face the upper or lower major surface of the magnetic disk 1 and forms an air foil therebetween. Further, each air bearing surface 2b includes an oblique guide surface part 2c at the longitudinal end thereof corresponding to the upstream side of the relative motion of the disk 1 to the head 2, for introducing the air into a gap formed between the air bearing surface 2b and the corresponding major surface of the magnetic disk 1. Further, at an end surface 2d corresponding to the downstream end of the relative motion of the disk 1, there is provided a thin-film head 2e of which construction is shown in detail in FIG. 4.

Figure 4:
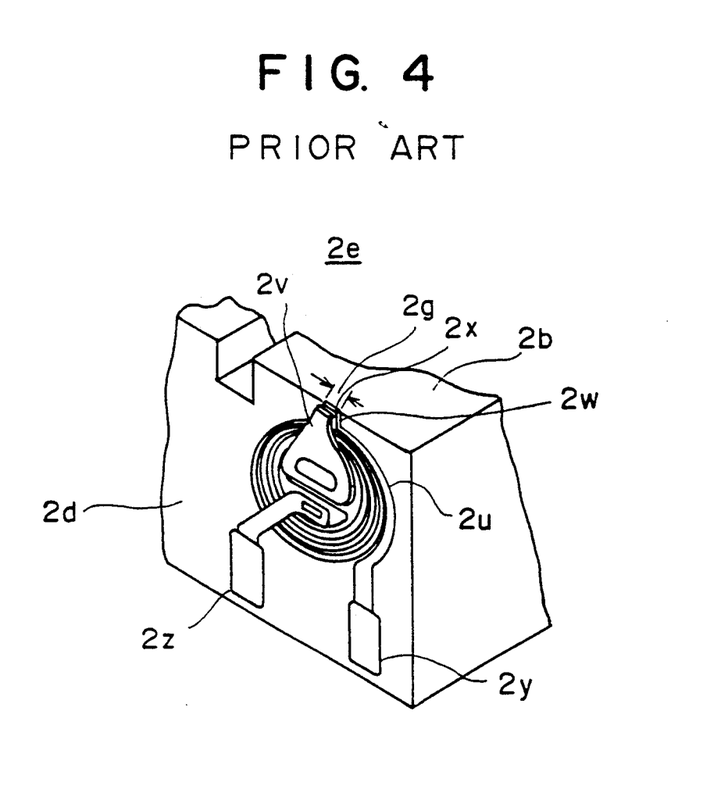
FIG. 4 is a diagram showing a thin-film head provided on the magnetic head of FIG. 3 in an enlarged scale.

Referring to FIG. 4, the thin-film head 2e includes a winding pattern 2u and a pair of thin-film magnetic yokes 2v and 2w provided on the end surface 2d of the head body 2, wherein the magnetic yoke 2w is formed underneath the winding pattern 2u while the magnetic yoke 2v is formed above the winding 2u. The magnetic yokes 2v and 2w extend toward the air bearing surface 2b and forms a gap 2x for creating a magnetic flux penetrating into the magnetic layer that is coated on the surface of the disk 1. Further, it will be noted that bonding pads 2y and 2z are provided on the end surface 2d for external electrical connection.

Figure 5:
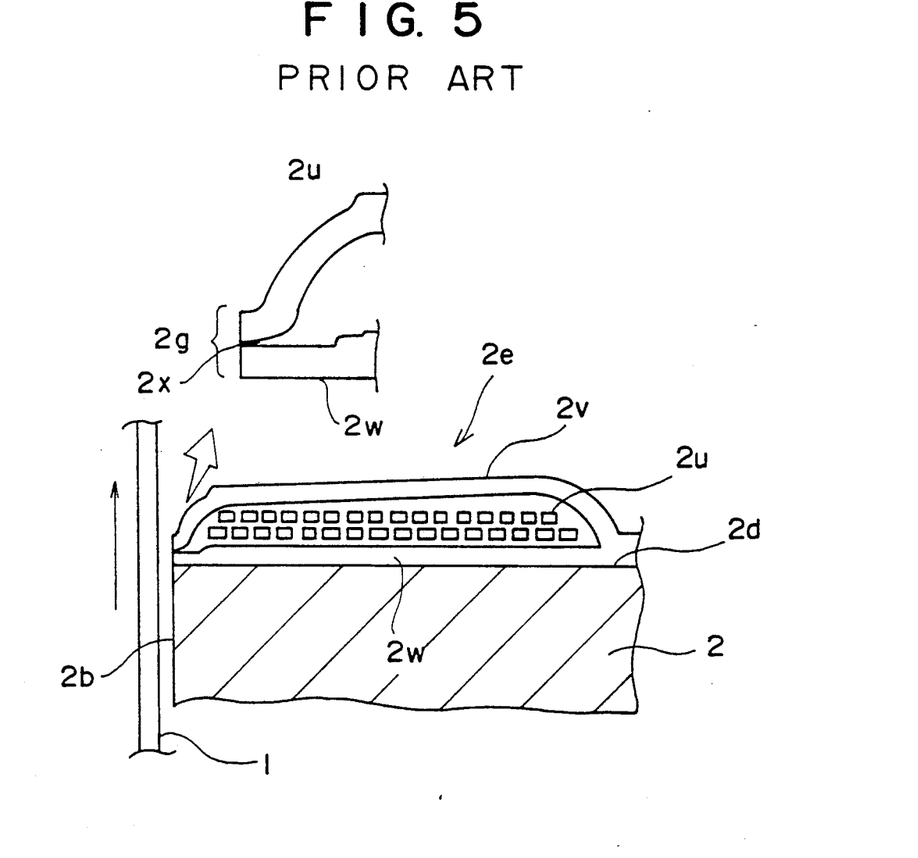
FIG. 5 is a diagram showing the thin-film head of FIG. 4 in a cross sectional view.

FIG. 5 shows the structure of the thin-film head 2e in vertical cross section, wherein the upper diagram in FIG. 5 shows the gap part of the head in an enlarged scale.

Referring to FIG. 5, it will be noted that the winding pattern 2u is provided in the space formed between the upper yoke 2v and the lower yoke 2w in two layers, wherein the space is filled by an insulating material. The lower yoke 2w is provided on the surface 2d of the head body 2, wherein the upper and lower yokes 2v and 2w approach with each other at the gap portion 2g, leaving a minute gap corresponding to the gap 2x therebetween as represented in the upper diagram of FIG. 5. There, the disk 1 moves along the air bearing surface 2b in the direction indicated by an arrow in FIG. 5, and the gap part 2g is formed substantially flush to the air bearing surface 2b. Thereby, the magnetic flux exiting from the yoke 2v and returning to the yoke 2w or vice versa crosses the magnetic coating on the disk 1 and causes a horizontal recording of information in the magnetic coating of the rigid magnetic disk 1 as usual.

Next, the conventional process for fabricating such a thin-film head 2e will be described with reference to FIGS. 6(A)-6(G).

Figure 6A:
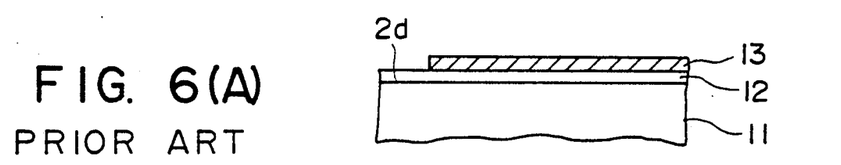
FIGS. 6(A)-6(G) are diagrams showing the process for fabricating the thin-film head of FIG. 4.

Referring to FIG. 6(A) first, an insulation layer 12 of $Al_2O_3$ is provided on an upper major surface corresponding to the surface 2d of a substrate 11 that forms the head body 2. Typically, $Al_2O_3$.TiC is used for the substrate 11. Further, on the upper major surface of the insulation layer 12, a permalloy (Fe/Ni alloy) layer 13 forming the lower yoke 2w is deposited by an electroplating process. The permalloy layer 13 is patterned to form a generally triangular lower yoke 2w. Typically a deposition rate of 1500-2000 Å/min is employed for the formation of the layer 13.

Figure 6B:
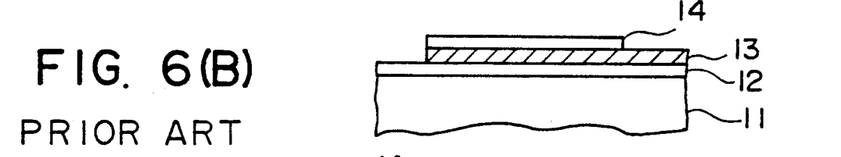
Figure 6C:
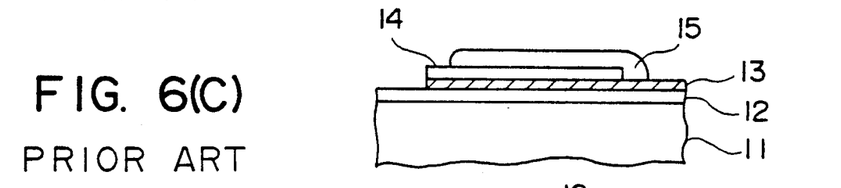

Next, in the step of FIG. 6(B), a gap layer 14 of $Al_2O_3$ is deposited in correspondence to the gap to be formed between the lower yoke 2w and the upper yoke 2v, and an insulation layer 15 is deposited further thereon in a step of FIG. 6(C) except for the part where the gap region 2g is to be formed. The insulation layer 15 may be a photoresist that is baked after patterning to form a mechanically rigid and chemically stable insulator.

Figure 6D:
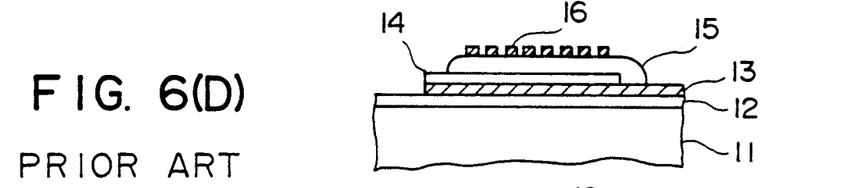

Next, in a step of FIG. 6(D), a spiral-shaped resist pattern is formed on the layer 15 and a conductor layer such as copper is deposited on the patterned surface of the insulator layer 15 by an electro-plating process.

Typically, a deposition rate of about 1000–1300 Å/min is used, and a winding pattern 16 corresponding to the winding pattern 2u of FIG. 4 is obtained after removal of the spiral-shaped resist pattern. Further, the remaining copper layer is removed by a wet etching process that is typically conducted at a temperature of about 15°–17° C. in an etchant solution of ammonium persulfate, while protecting the winding pattern 16 by a photoresist.

Figure 6E:
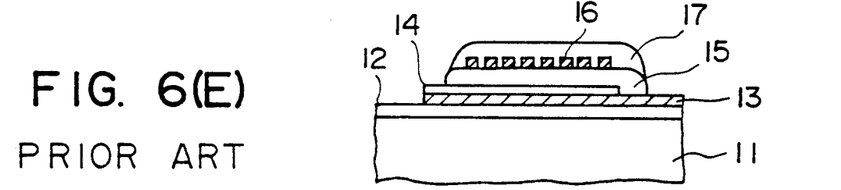

Next, in a step of FIG. 6(E), an insulation layer 17 is deposited to bury the winding pattern 16 underneath. Typically, a photoresist is used for the layer 17. There, the photoresist is deposited and patterned photolithographically to form a layer corresponding to the layer 17, and the layer thus formed is subjected to a baking process to convert the photoresist to a stable insulation layer 17.

Next, in a step of FIG. 6(F), another permalloy layer 18 corresponding to the upper yoke 2v is deposited on the structure of FIG. 6(E) by an electro-plating process and patterned subsequently in accordance with the generally triangular shape of the upper yoke 2v. Further, in a subsequent step of FIG. 6(G), an upper protective layer 19 of $Al_2O_3$ is deposited on the layer 18, and the structure thus obtained is subjected to a grinding and finishing process starting from the left side in FIG. 6(G) to form the thin-film head structure shown in FIG. 5.

In the foregoing steps such as the step of FIG. 6(A), one encounters a problem of depositing the permalloy layer 13 on the insulating layer 12 by means of the electro-plating process. A similar problem occurs also in the step of FIG. 6(D) for depositing a copper layer on the baked photoresist layer 15 or in the step of FIG. 6(F) for depositing the upper permalloy layer. In order to enable the electro-plating on the insulator layer, the use of a conductive base layer has been employed conventionally as shown in FIGS. 7(A)–7(E), wherein these drawings correspond to the step of FIG. 6(A) for forming the lower magnetic yoke 2w. It should be noted that the upper drawings in FIGS. 7(A)–7(E) represent the plan view while the lower drawings represent the corresponding cross-sectional view.

Figure 7A:
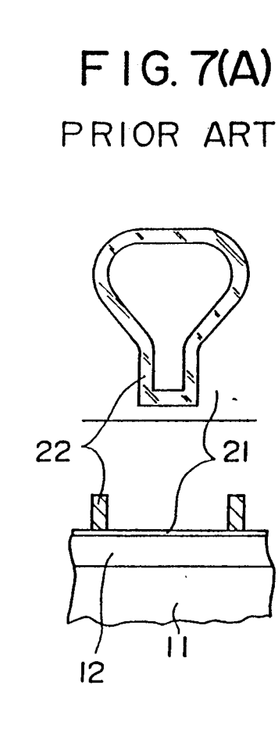
FIGS. 7(A)-7(E) are diagrams showing the fabrication process of a thin-film magnetic yoke employed in the fabrication process of FIG. 6(A)

Referring to FIG. 7(A), a conductive base layer 21 is deposited on the upper major surface of the insulation layer 12 by evaporation or sputtering. The base layer 21 has a composition substantially identical with the permalloy layer to be grown thereon. Further, a photoresist is deposited on the layer 21 and patterned subsequently in accordance with the outer boundary of the lower magnetic yoke 2w to be formed. Thereby, the patterned resist 22 circles the region on which the magnetic yoke 2w is to be formed.

Figure 7B:
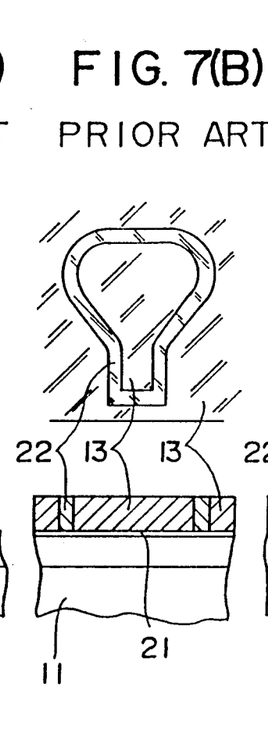

Next, in the step of FIG. 7(B), the permalloy layer 13 is deposited on the base layer 21 by the electro-plating process while using the base layer 21 as an electrode. Thereby, the permalloy layer 13 covers the surface of the layer 21 except for the part covered by the patterned resist 22.

Figure 6F:
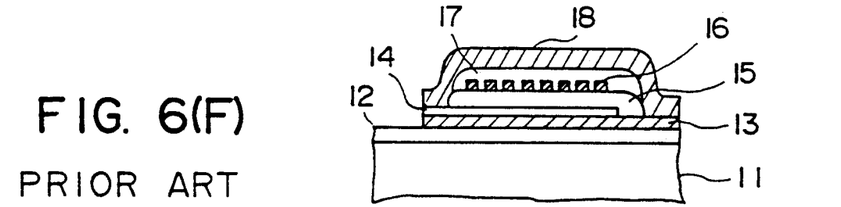
Figure 7C:
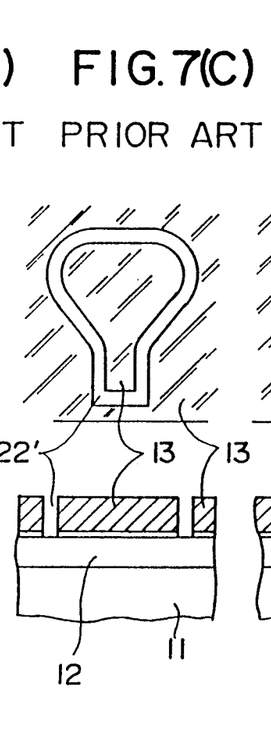

Next, in the step of FIG. 7(C), the photoresist 22 is removed to form a groove 22' in correspondence to where the patterned resist 22 has been provided, and the entire structure is subjected to an ion milling process such that the base layer 21 is removed entirely from the groove 22'. Further, a resist 23 is deposited and patterned subsequently to cover selectively the patterned layer 13 corresponding to the lower magnetic yoke 2w in a step of FIG. 7(D), and the remaining permalloy layer 13 is removed in a step of FIG. 7(E) by a wet etching process while protecting the lower magnetic yoke 2w by a resist 23. Further, in the step of FIG. 7(E), the conductive base layer 21 that is exposed as a result of the wet etching of the layer 13 is removed by an ion milling process or sputter etching process. Typically, the wet etching process of permalloy is conducted at a temperature of 22°–24° C. by an etchant that includes purified water, sulfuric acid and hydrogen peroxide with a volume ratio of 1000 ml:340 ml:180 ml. It should be noted that a similar conductive base layer used when providing the copper winding pattern 16 on the insulator layer 15 as shown in FIG. 6(D) and also in the step of FIG. 6(F) wherein the upper magnetic yoke 18 is provided on the insulation layer 17 by the electro-plating process.

Figure 7D:
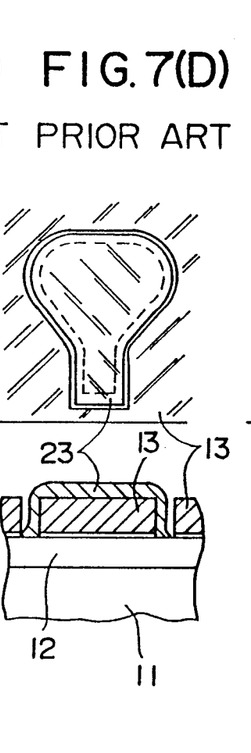

In the foregoing step of FIG. 7(C), the ion milling process is applied to remove the conductive base 21 in correspondence to the groove 22' such that the conductor base 21 is completely removed in correspondence to the groove 22' such that the exposed surface of the layer 21 is covered directly by the photoresist 23 in the step of FIG. 7(D). Thereby, one can prevent the wet etching conducted in the step of FIG. 7(E) from penetrating laterally into the region located under the lower magnetic yoke 13 along the exposed conductor layer 21.

Figure 7E:
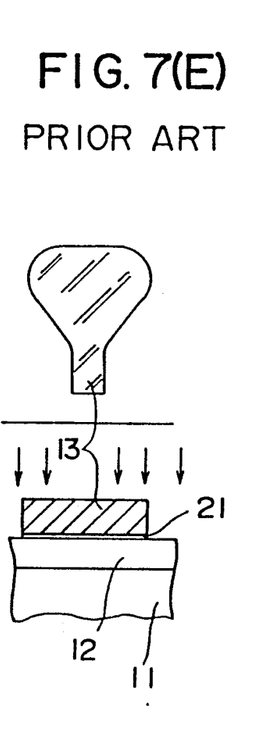

On the other hand, the ion milling process in the step of FIG. 7(E) is conducted to remove the conductor layer 21 completely for eliminating the problem of short circuit. In order to assure that no conductor layer 21 remains on the exposed surface, the ion milling process of FIG. 7(E) is conducted to penetrate relatively deeply. It should be noted that the deviation in the compositional uniformity or layer thickness in the layer 21 tends to cause a variation in the ion milling rate, and there is a substantial risk that a part of the conductive base layer 21 remains unremoved, particularly in view of the large area that is subjected to the ion milling process. The same problem occurs when a sputter etching process is employed in place of the ion milling process. In addition, such a physical etching process applied to a large depth causes various problems such as long processing time that decreases the throughput of production. Hereinafter, the problem associated with the physical etching process employed in the step of FIG. 7(E) will be examined briefly with reference to FIG. 8.

Figure 8:
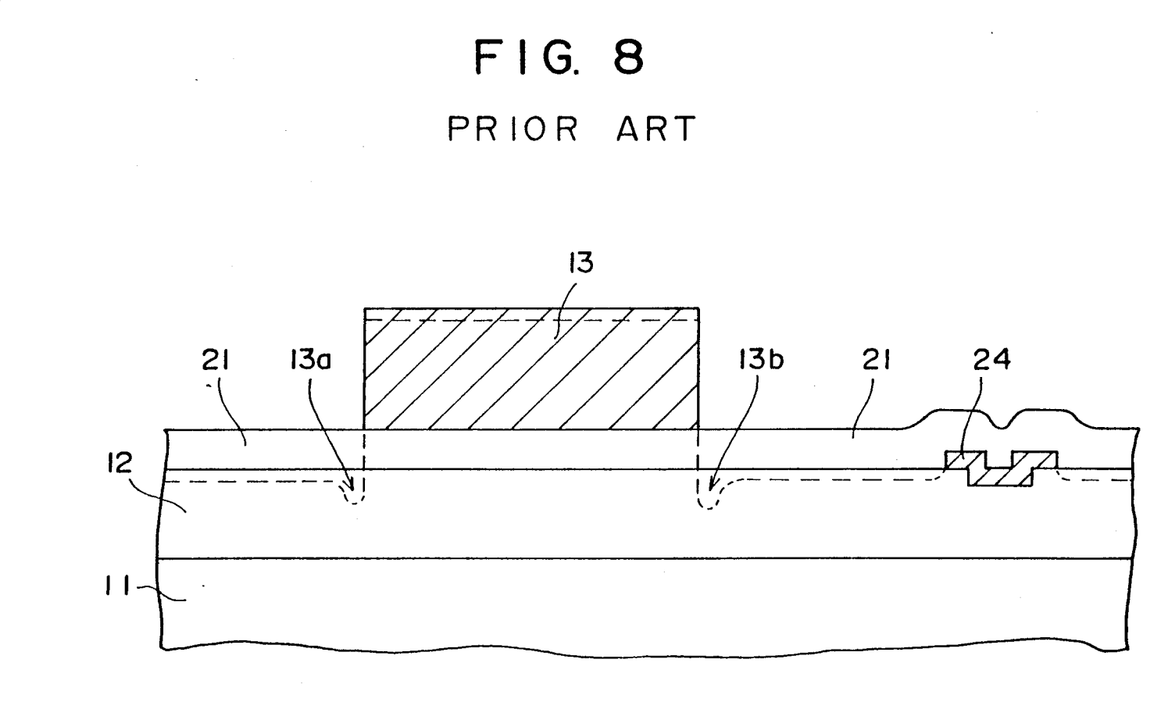
FIG. 8 is a diagram for explaining a problem associated with the conventional fabrication process of the thin-film head.

FIG. 8 shows the physical etching process conducted in the step of FIG. 7(E), wherein the solid line and the broken line represent respectively the state before and after the physical etching. There, it will be noted that the part of the layer 12 at both sides of the pattern 13 is grooved deeply as represented by the numerals 13a and 13b because of the concentrated bombardment of atoms such as Ar that is used for ion milling or sputter etching. When there exists such a deep groove on the surface of the layer 12, various problems such as disconnection of the interconnection may occur. Further, the depth of the etching tends to differ location to location even in the marginal region that surrounds the pattern 13, and the fabrication of thin-film heads based upon such an unreliable and unpredictable process is extremely difficult particularly in the cases where a very high precision is required for the magnetic heads.

Another and probably more serious problem associated with the use of the physical etching of the layer 21 would be that the alignment marker such as a pattern 24, which is provided on the surface of the layer 12 for the sake of the positional reference for various patterning processes, may be worn out as a result of the abrasive action of the physical etching. When the marker pattern 24 becomes obscured, the subsequent patterning process such as the formation of the winding pattern 16 becomes extremely difficult. Thereby, the throughput of the device production as well as the yield of the product are inevitably deteriorated. It should be noted that the alignment marker 24 is formed of a metal having a high reflectance such as Ti and may have a thickness of 1000 -2000 Å, for example. When the alignment marker 24 is obscured as such, not only the patterning of the lower magnetic yoke 2w but also the formation of the winding pattern 16 as well as the upper magnetic yoke 2v becomes difficult.

SUMMARY OF THE INVENTION

Accordingly, it is a general object of the present invention to provide a novel and useful process for fabricating a thin-film magnetic head wherein the foregoing problems are eliminated.

Another and more specific object of the present invention is to provide a process for fabricating a thin-film magnetic head wherein a selective removal of the conductive base layer used for an electrode in an electroplating process is possible after a conductor pattern is deposited thereon by the electro-plating process.

Another object of the present invention is to provide a process for fabricating a thin-film magnetic head, comprising the steps of: providing an alignment marker used for pattern alignment on an upper major surface of a layer of an insulating material; depositing a conductor base layer on said upper major surface to bury said alignment marker underneath; growing a pattern on an upper major surface of said conductor base layer by an electro-plating process, said electro-plating process being conducted while using said conductor base layer as an electrode; removing said conductor base layer except for a part thereof located under said pattern by a chemical etching process that acts selectively upon said conductor base layer while leaving said alignment marker substantially unetched. According to the present invention, one can remove the conductor base layer selectively while leaving the alignment marker substantially intact. Thereby, the problem of difficulty in achieving alignment in the patterning processes is substantially eliminated. Further, the chemical etching process can be conducted such that the etching stops automatically at the interface between the insulation layer and the conductive base layer. Thereby, the problem of non-uniform etching leading to an incomplete removal of the conductor baser layer is successfully eliminated.

Other objects and further features of the present invention will become apparent from the following detailed description when read in conjunction with the attached drawings.

DETAILED DESCRIPTION OF THE PREFERRED EMBODIMENTS

Figure 9:
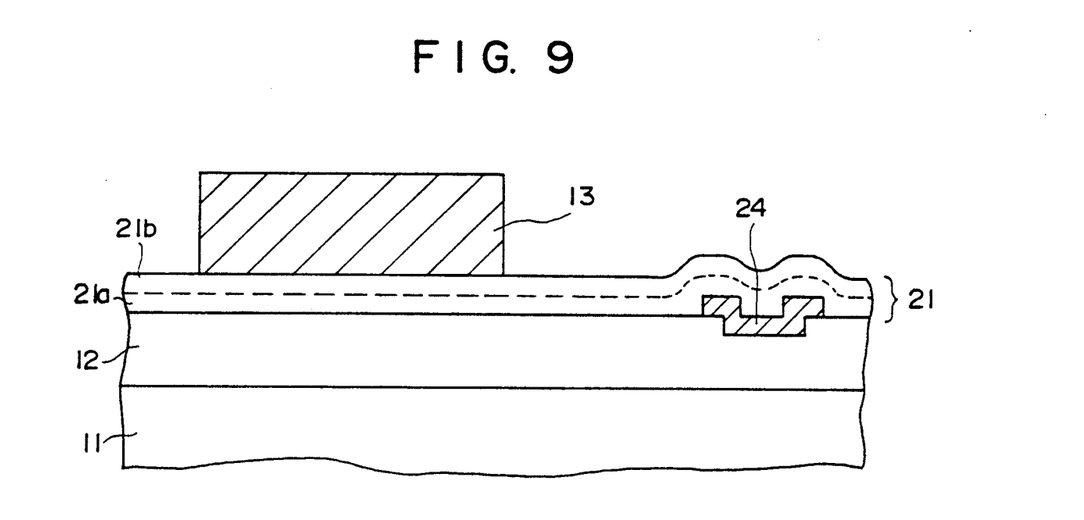
FIGS. 9-11 are diagrams showing the essential process for fabricating a thin-film head according to a first embodiment of the present invention.
Figure 10:
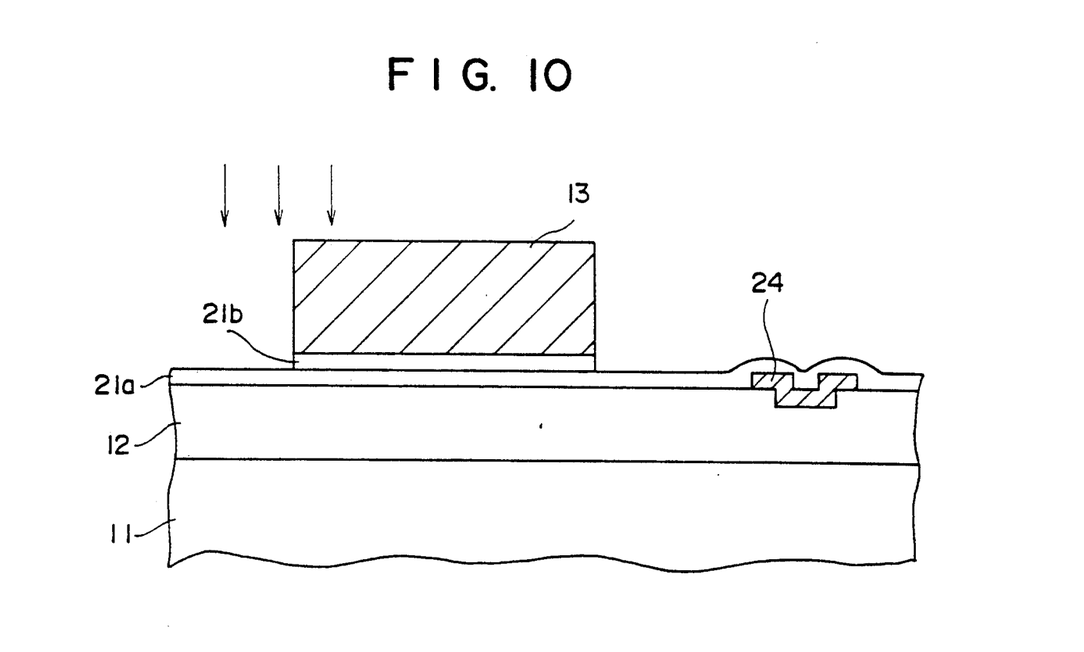
Figure 11:
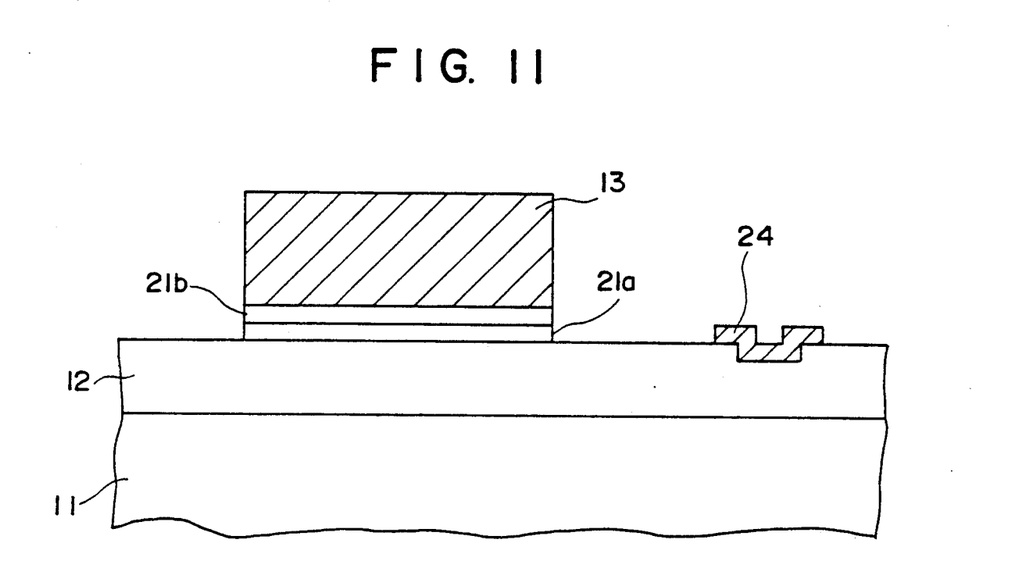

FIGS. 9-11 represent a process for fabricating the thin-film head according to an embodiment of the present invention, wherein the process described hereinafter is applicable to the step of FIG. 7(C) or to the step of FIG. 7(E) for removing the conductor base layer 21. As already noted, the steps of FIGS. 7(A)-7(E) correspond to the fabrication process of FIG. 6(A). Further, as will become clear from the second embodiment to be given later, the process of the present invention is applicable also to the patterning of the winding pattern 16 in the step of FIG. 6(D).

Referring to FIG. 9, the present embodiment employs a double layer structure for the conductor base 21, wherein the layer 21 includes a lower layer 21a deposited directly on the insulator layer 12 and an upper layer 21b deposited further thereon. There, the layer 21a covers the alignment mark 24, and the upper pattern 13 of permalloy is grown on the layer 21b by the electro-plating process similarly to the conventional process. As already mentioned, the composition of the layer 21b is set substantially identical with the composition of the pattern 13. In other words, permalloy is used for the layer 21b.

In the present embodiment, the material for the lower layer 21a is selected carefully such that the layer 21a shows a distinct etching rate with respect to the underlying layer 12 and further with respect to the material that forms the alignment marker 24. In the case where the layer 12 is formed of $Al_2O_3$ and the alignment mark 24 formed of Ti, aluminum (Al) is selected for the material forming the lower layer 21a. It should be noted that Al shows an excellent adherence to the permalloy layer 21b that is deposited thereon. By setting the composition of the layer 21a as such, one obtains an excellent selectivity in the etching rate between the layer 21a and the layer 12 and further between the layer 21a and the pattern 24 when a reactive ion etching process using $CCl_4$ as an etching gas is employed as will be described later. Typically, the layer 21a is deposited with a thickness of about 500 Å, while the permalloy layer 21b is deposited with a thickness of about 1000 Å.

Next, in the step shown in FIG. 10, the upper layer 21b is subjected to a physical etching process such as ion milling or sputter etching such that the lower layer 21a is exposed. The physical etching process is not necessarily be conducted strictly uniform. On the other hand, the process has to be stopped before the lower layer 21a is etched substantially.

Next, in the step of FIG. 11, the lower layer 21a of Al is removed by the reactive ion etching process using CCl$_4$ as described previously, wherein the reactive ion etching process acts selectively against the layer 21a because of the difference in the etching rate, and the upper major surface of the layer 12 as well as the alignment marker 24 are exposed substantially intact as shown in FIG. 11.

In the foregoing process of FIGS. 9–11, one may employ titanium (Ti) for the lower layer 21a in place of Al. In this case, too, an excellent adherence of the layer 21b is achieved on the layer 21a. In order to secure the necessary difference in the etching rate, the alignment marker 24 of gold (Au) is employed, and CF$_4$ is used for the reactive ion etching. Again, one can secure a distinctive difference in the etching rate between the layer 21a and the underlying Al$_2$O$_3$ layer 12.

Next, a second embodiment of the present invention will be described with reference to FIGS. 12–14, wherein the present embodiment corresponds to the process of FIG. 6(D).

Figure 12:
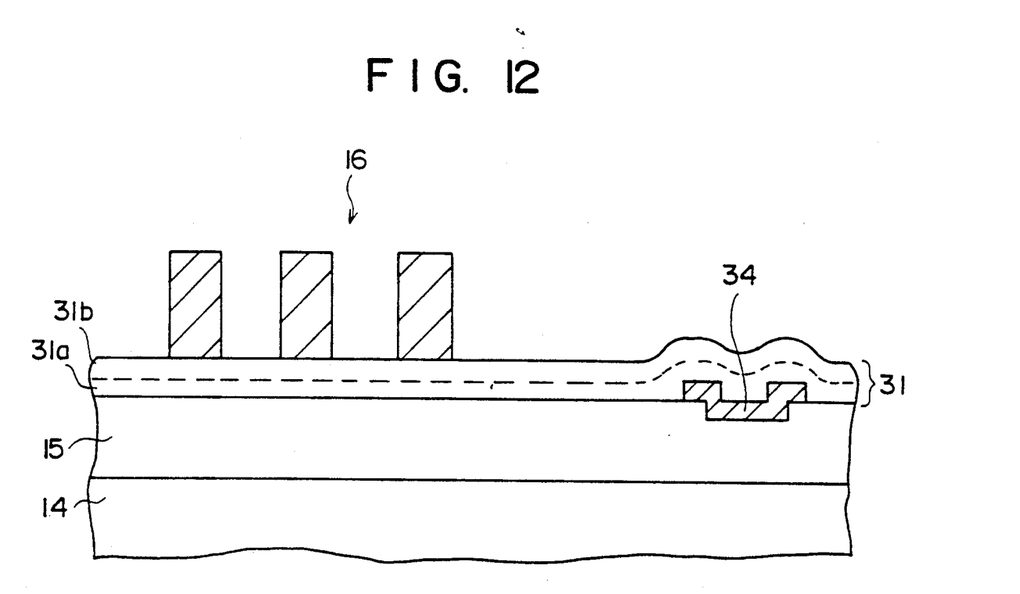
FIGS. 12-14 are diagrams showing the essential process for fabricating a thin-film head according to a second embodiment of the present invention.

Referring to FIG. 12, an alignment marker 34 similar to the alignment marker 24 is provided on the insulation layer 15 that covers the Al$_2$O$_3$ layer 14. There, the marker 34 is formed of Au and is buried under a Ti layer 31a that covers the upper major surface of the insulation layer 15 with a thickness of about 500 Å. It should be noted that the insulation layer 15 is formed of a baked photoresist as already mentioned.

On the upper major surface of the layer 31a, there is provided another layer 31b of Cu with a thickness of about 1000 Å, and the winding pattern 16 of Cu is grown on the layer 31b by an electro-plating process with a thickness of about 1000–2000 Å. Typically, a deposition rate of 1000–1300 Å/min is used while using a photoresist patterned into a spiral form as a mask. FIG. 12 shows the state where the photoresist mask is removed. As a result of the electro-plating process, the spiral winding pattern 16 of Cu is formed. It should be noted further that a layer of copper not illustrated remains also somewhere on the surface of the layer 31b.

Figure 13:
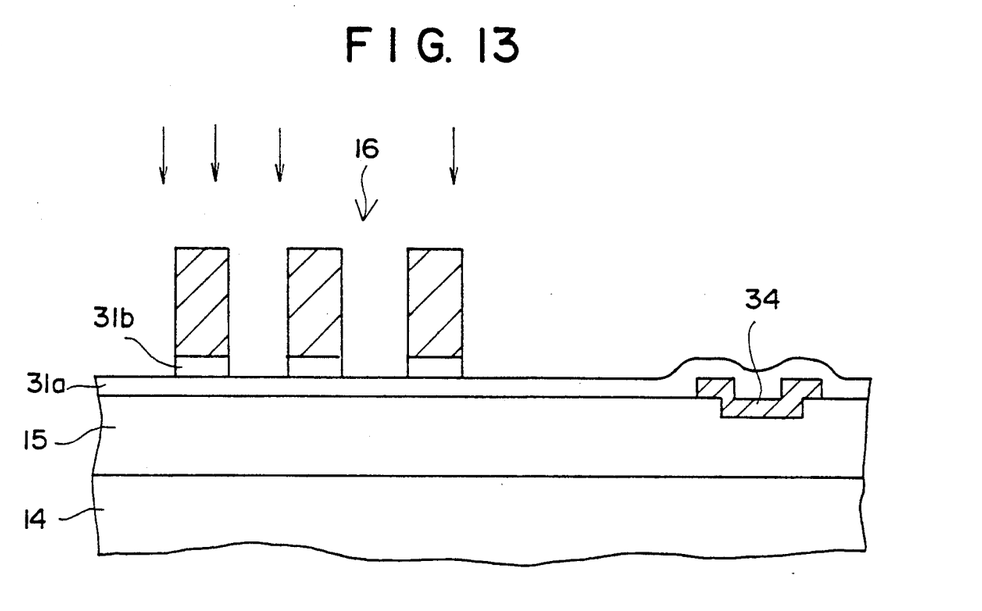
Figure 14:
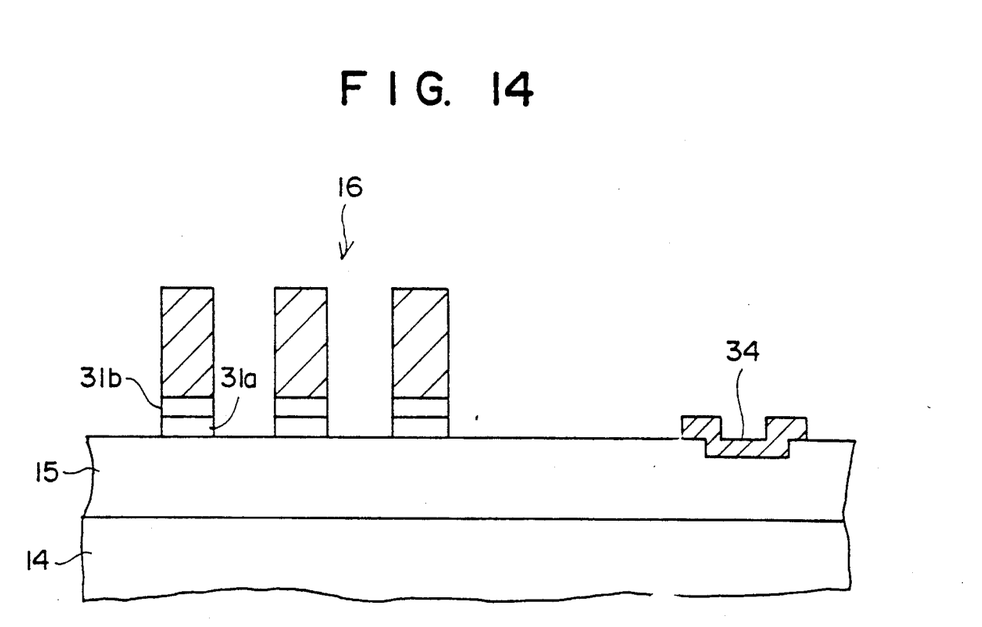

Next, in the step of FIG. 13, the upper layer 31b of Cu is removed by a physical etching process such as ion milling or sputter etching similarly to the first embodiment. Further, in the step of FIG. 14, the lower layer 31a is removed by a reactive ion etching process that uses CF$_4$ as the etching gas similarly to the first embodiment. After the structure of FIG. 14 is formed, a photoresist not illustrated is deposited to protect the spiral winding pattern 16 and the remaining copper layer is removed by a wet etching process that uses ammonium persulfate at a temperature of 15°–17° C. Thereby, the structure of FIG. 6(D) is obtained.

Figure 6G:
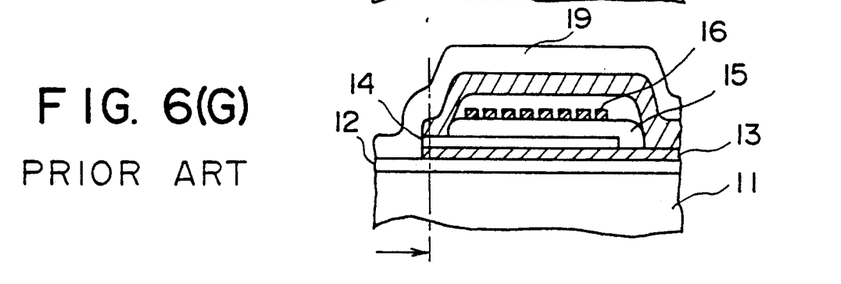

After the process of FIG. 6(D), the conventional processes described with reference to FIGS. 6(E)–(G) are conducted and a thin-film head having a structure shown in FIG. 5 is obtained. As the alignment marker 34 remains substantially intact in the process described heretofore, the subsequent fabrication process including the patterning of the upper magnetic yoke 2v is achieved with high precision and one can fabricate the thin-film head with improved precision as well as improved yield.

In the foregoing embodiments, it should be noted that one may use also the Fe/Ni alloy for the marker patter 24.

Further, the present invention is not limited to the embodiments described heretofore, but various variations and modifications may be made without departing from the scope of the invention.

What is claimed is:

1. A method for fabricating a thin-film magnetic head, comprising the steps of:
   providing an alignment marker used for alignment in patterning processes on an upper major surface of an insulating layer;
   depositing a conductor base layer on said upper major surface to bury said alignment marker underneath;
   growing a pattern on an upper major surface of said conductor base layer by an electro-plating process, said electro-plating process being conducted while using said conductor base layer as an electrode;
   removing said conductor base layer except for a part thereof located under said pattern by a chemical etching process that acts selectively upon said conductor base layer while leaving said alignment marker and the insulating layer substantially unetched.

2. A method as claimed in claim 1, wherein said step of depositing said conductor base layer comprises a first step for depositing a first conductor base layer having a first composition that shows a substantially reduced etching rate as compared with said insulating layer and said alignment marker, and a second step for depositing a second conductor base layer having a second composition that is different from said first composition on said first conductor base layer.

3. A method as claimed in claim 2, wherein said second composition of said second base layer is set substantially identical with said pattern that is grown on said upper major surface of said conductor base layer.

4. A method as claimed in claim 3, wherein said step of removing said conductor base layer comprises a physical etching step for removing said second conductor base layer except for a part thereof located underneath said pattern, and a chemical etching step for removing said first conductor base layer selectively against said insulating layer and said alignment mark by said chemical etching process.

5. A method as claimed in claim 2, wherein said alignment marker is formed of a material selected from a group consisting essentially of gold, titanium and an iron-nickel alloy, said first conductor base layer is formed of a material selected from a group essentially consisting of titanium and aluminum, and said second conductor base layer is formed a material selected from a group essentially consisting of copper and an iron-nickel alloy.

6. A method as claimed in claim 5, wherein said alignment marker is formed of gold, said first base layer is formed of titanium, said second base layer is formed of copper, and said pattern is formed of copper, wherein said pattern forms a magnetic winding of said thin film head.

7. A method as claimed in claim 5, wherein said alignment marker is formed of titanium, said first base layer is formed of aluminum, said second base layer is formed of said iron-nickel alloy, and said pattern is formed also of said iron-nickel alloy, wherein said pattern forms a magnetic yoke of said thin film head.

8. A method as claimed in claim 5, wherein said alignment marker is formed of gold, said first base layer is formed of titanium, said second base layer is formed of said iron-nickel alloy, and said pattern is formed also of said iron-nickel alloy, wherein said pattern forms a magnetic yoke of said thin film head.

9. A method as claimed in claim 2, wherein said step of chemical etching comprises a reactive ion etching process.

10. A method as claimed in claim 9, wherein said reactive ion etching process conducted in said step of chemical etching uses $CF_4$ as an etching gas.

11. A method as claimed in claim 9, wherein said reactive ion etching process conducted in said step of chemical etching process uses $CCl_4$ as an etching gas.

12. A method as claimed in claim 1, wherein said insulating layer comprises aluminum oxide.

13. A method as claimed in claim 1, wherein said insulating layer is formed by baking a photoresist.

* * * * *